United States Patent [19]

Esser et al.

[11] Patent Number: 4,833,770

[45] Date of Patent: May 30, 1989

[54] FLEXIBLE MANUFACTURING SYSTEM FOR MACHINING WORKPIECES

[75] Inventors: Karl-Josef Esser; Eckhard Berner, both of Mönchengladbach, Fed. Rep. of Germany

[73] Assignee: Scharmann GmbH & Co., Monchengladbach, Fed. Rep. of Germany

[21] Appl. No.: 166,659

[22] Filed: Mar. 11, 1988

[30] Foreign Application Priority Data

| Mar. 11, 1987 | [DE] | Fed. Rep. of Germany | 3707690 |
| Apr. 18, 1987 | [DE] | Fed. Rep. of Germany | 3713189 |
| Apr. 25, 1987 | [DE] | Fed. Rep. of Germany | 3713868 |
| Dec. 12, 1987 | [DE] | Fed. Rep. of Germany | 3742187 |

[51] Int. Cl.$^4$ ............................................. B23Q 3/157
[52] U.S. Cl. ........................................................ 29/568
[58] Field of Search ............... 29/26 A, 568; 414/783, 414/736, 738

[56] References Cited

U.S. PATENT DOCUMENTS

| 3,647,090 | 3/1972 | Suzuki et al. | 414/626 |
| 3,667,114 | 6/1972 | Smith et al. | 29/568 |
| 4,528,742 | 7/1985 | Peacock | 29/568 |
| 4,637,120 | 1/1987 | Geiger | 29/568 |
| 4,656,728 | 4/1987 | Saeki et al. | 29/568 |
| 4,675,977 | 6/1987 | Kölblin et al. | 29/568 |
| 4,698,898 | 10/1987 | Horsch | 29/568 |
| 4,711,016 | 12/1987 | Genschow et al. | 29/568 |

FOREIGN PATENT DOCUMENTS

| 154349 | 9/1985 | European Pat. Off. | 29/568 |
| 235639 | 9/1987 | European Pat. Off. | 29/568 |
| 240709 | 10/1987 | European Pat. Off. | 29/568 |
| 3440604 | 5/1986 | Fed. Rep. of Germany | 29/568 |
| 237807 | 7/1986 | Fed. Rep. of Germany | 29/568 |
| 248534 | 8/1987 | Fed. Rep. of Germany | 29/568 |
| 54044 | 3/1982 | Japan | 29/568 |
| 30639 | 2/1984 | Japan | 29/568 |

*Primary Examiner*—William Briggs
*Attorney, Agent, or Firm*—Becker & Becker, Inc.

[57] ABSTRACT

A flexible manufacturing system for machining workpieces. The system encompasses several tool machines, a storage unit that includes several tool shelves that are disposed along a guideway and have recesses for holding the tools. The guideway is disposed directly adjacent the row of tool machines, and the shelves have horizontal bottoms for supporting tools in a perpendicular manner. A transporting unit transports tools from the storage unit to a transfer station, with the transporting unit having a horizontally disposed pivot arm assembly for transporting tools in a perpendicular position. A changing device is adapted to grasp a new tool from the transporting unit and a used tool from a tool machine in two planes that are perpendicular to one another, and to pivot these tools by 180° to bring them into planes that are perpendicular to the planes that they were in when they were grasped.

18 Claims, 7 Drawing Sheets

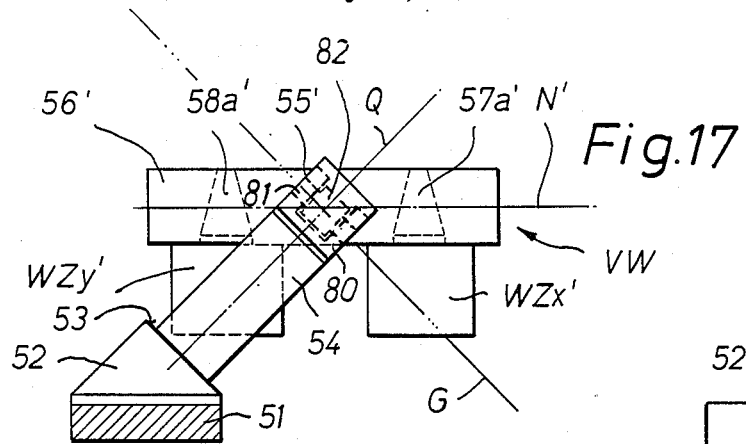
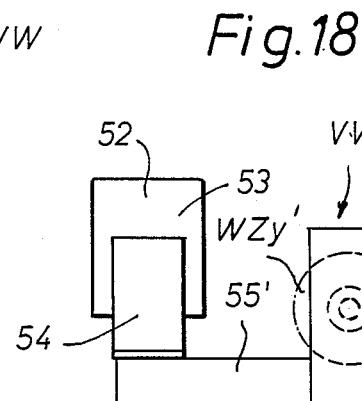
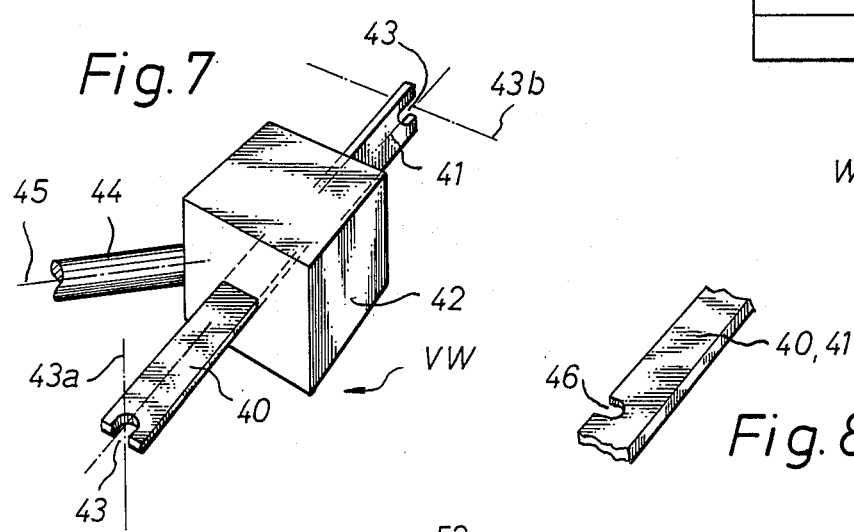
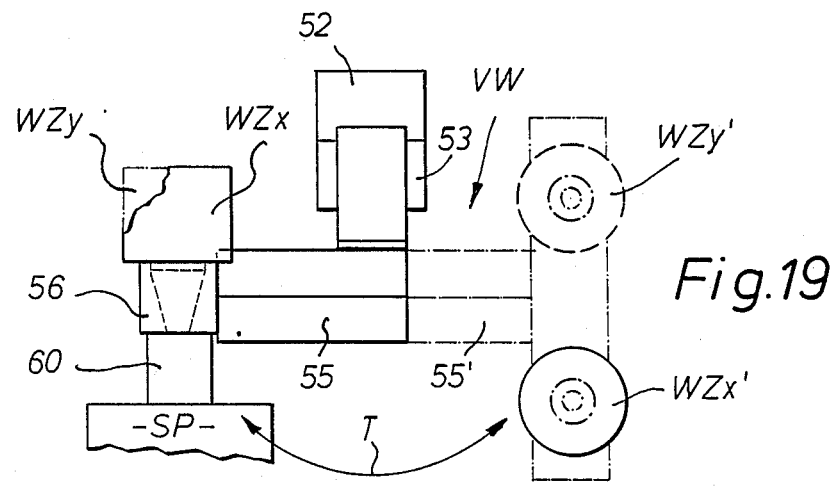

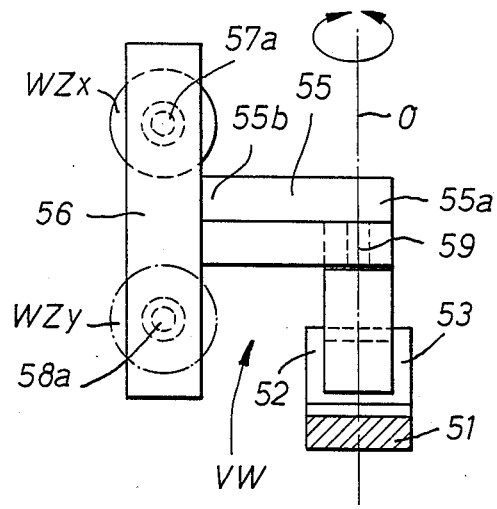
Fig.13
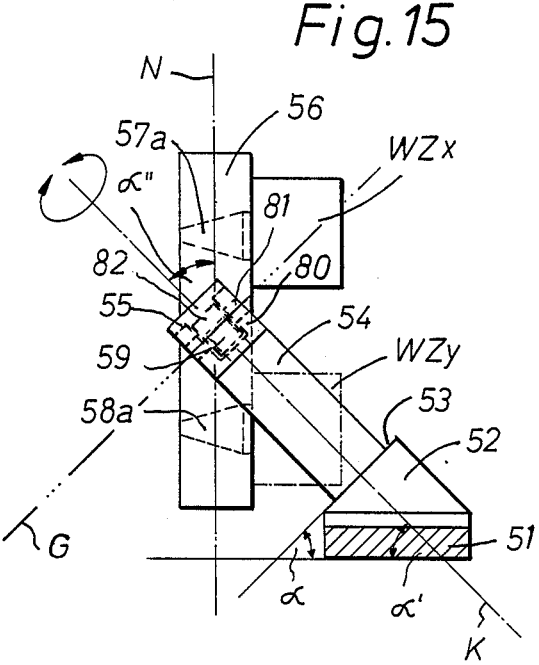
Fig.15
Fig.14
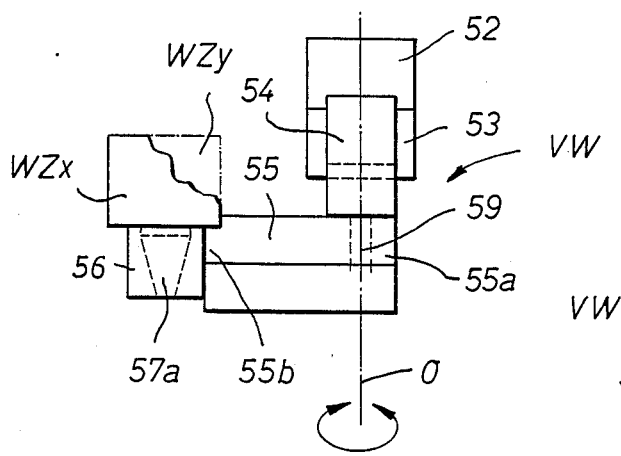
Fig.16

FLEXIBLE MANUFACTURING SYSTEM FOR MACHINING WORKPIECES

BACKGROUND OF THE INVENTION

The present invention relates to a flexible manufacturing system for machining workpieces.

German Publication No. 32 43 335-Genschow et al. dated Sept. 9, 1984 and European Publication No. 83 73 01 084-Genschow et al dated June 13, 1984 (Publication No. 0110815-Genschow et al), each corresponding to U.S. Pat. No. 4,711,016-Genschow et al dated Dec. 8, 1987, disclose a flexible manufacturing system where a transporting unit has a cross gantry construction, and the tools can be individually transported between a tool repository and tool machines with the aid of a gripper mechanism that operates both vertically and horizontally. Also known is a flexible manufacturing system that includes a high shelf and four horizontal tool machines that are interconnected by a shelf-control unit. Two tool-transporting devices are provided in the central storage region for handling the tools, and four tool exchange devices for exchanging the tools are disposed in tool magazines of the machines, with these magazines moving along during the machining (1980 discussion of the Sonderforschungsbereichs 155 "Flexible Fertigungssysteme, June 9, 1980, University of Stuttgart).

German Gebrauchsmuster No. 85 20 123-Burkhardt & Weber dated Jan. 2, 1985 discloses a support magazine for storing the tools of a tool machine that is equipped with a device for exchanging tools. The tools are stored in horizontal rows one above the other, with several shelves leaving a street between them for the transport of the tools. Also known from German Publication No. 1 261 373-Sedquick dated Oct. 24, 1967 and U.S. Pat. No. 3,348,298 are changing arms that are provided at both ends with grippers. An exchange of the tools is effected from two parallel positions, for example out of a tool machine magazine, into the spindle or arbor of the tool machine. German Publication No. 26 13 736-Caroi dated Oct. 28, 1976, U.S. Pat. No. 3,448,656, and French Publication No. 1 434 203-Hure dated Feb. 28, 1966 disclose tool machines where an angle-cutting head is rotatable about an axis that is inclined relative to the horizontal. The plane of rotation is disposed perpendicular to the inclined axis of rotation of the cutting head, with the latter carrying out a circular arc movement about the axis of rotation. However, it is not possible hereby to realize the task of the transfer mechanism, which is provided ahead of or after the transport device, of providing a changing arm that is in the position to exchange tools in two planes that are disposed at right angles to one another.

In contrast to these heretofore known manufacturing apparatus, it is an object of the present invention to provide a flexible manufacturing system where the tools are transported or transferred with structurally straightforward means, and in a time and space saving manner, from the shelf or shelves to the processing machines.

BRIEF DESCRIPTION OF THE DRAWINGS

This object, and other objects and advantages of the present invention, will appear more clearly from the following specification in conjunction with the accompanying schematic drawings, in which:

FIG. 7 is a perspective view of a first exemplary embodiment of the inventive changing device for simultaneously grasping and exchanging two tools that are disposed at right angles to one another via a double-sided changing arm;

FIG. 8 is a detailed view of one end region of the changing arm of FIG. 7;

FIGS. 13-19 are views that show the construction and various positions of a second exemplary embodiment of the inventive changing device and its support arm as well as the tools on this arm.

SUMMARY OF THE INVENTION

The flexible manufacturing system of the present invention comprises: several tool machines that are disposed in a row, a storage unit that includes several tool shelves that are disposed along a guideway and have recesses for holding the tools, with the guideway being disposed directly adjacent to the row of tool machines, and with the shelves having horizontal bottoms for supporting the tools in a perpendicular manner; a transporting unit for transporting tools from the storage unit to a transfer station, with this transporting unit having a horizontally disposed pivot arm assembly for transporting the tools in a perpendicular position; and a changing device for receiving tools from the transporting unit at the transfer station, with the changing device being adapted to grasp a new tool from the transporting unit and a used tool from a tool machine in two planes that are perpendicular to one another, and to pivot these tools by 180° to bring them into planes that are perpendicular to the planes that they were in when they were grasped.

The present invention provides the advantages that the shelf or shelves can store a large number of tools in a small space in the vicinity of the tool machines, that the grasping and transfer of the tools can be effected rapidly, and that the tools can be transported along a relatively short path from the shelves to the tool magazines and vice versa. The tools are suspended in the bottoms of the shelves, which can be provided with tools with no difficulty. The tools can be individually introduced into the shelves or removed therefrom. The transporting unit as well as the changing device are provided with elements that have short lever arms and provide for short movement times of the tools.

Further specific features of the present invention will be described in detail subsequently.

Description of Preferred Embodiments

Figure 3:
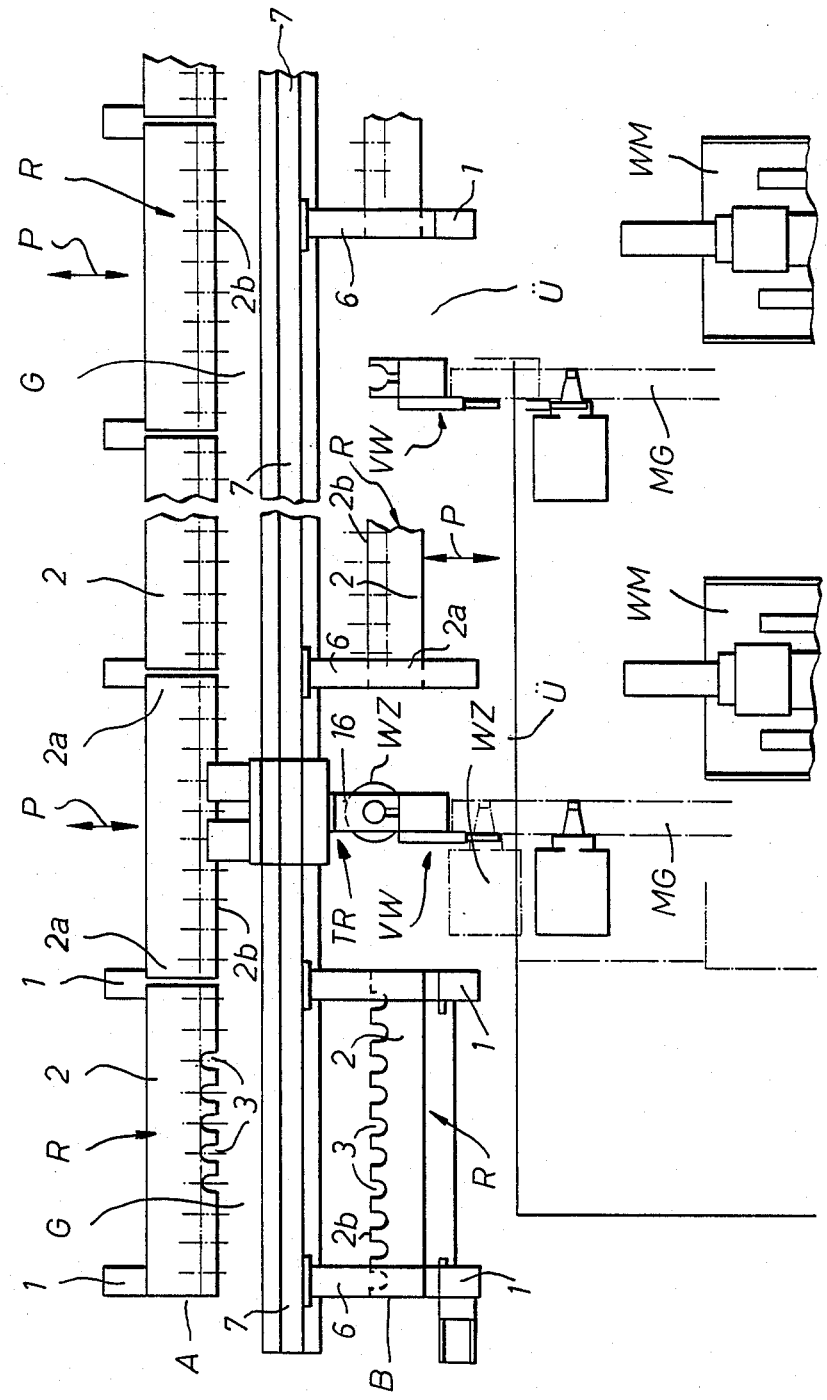
FIG. 3 is a plan view of one exemplary embodiment of the storage and transport arrangement of the present invention.

Referring now to the drawings in detail, the storage or holding portion L of the inventive storage and transporting arrangement is provided with a single row, or preferably two parallel rows A, B, of shelves R that are disposed adjacent to one another, have shelf supports 1, and are provided immediately after the tool machines WM. As shown in FIG. 3, these machines are also disposed one after the other in a row. The shelves R of the rows A, B are embodied identically. The shelf supports 1 are disposed at a given distance "a" from one another that corresponds to the length of the bottoms 2 of the shelves. The ends 2a of these bottoms are held in a non-illustrated manner on the columns 1 at a given height H; the significance of this height will be described below. The bottoms 2 of the shelves are furthermore provided with recesses 3 along one edge 2b thereof. These recesses 3 are provided next to one another in a row in such a way that they can hold the tools WZ in a row next to one another. The components 1, 2 respectively form a shelf R.

The supports 1 have a bracket 5 that corresponds to the brackets 4 of the shelf bottom 2. The bracket 5 supports a girder-like arm 6 on which is vertically disposed a support member 7, the lower end of which supports a longitudinally extending guide rail 8 in such a way that the latter forms for the transporting unit TR a guideway that extends parallel to the bottoms 2 of the shelves. Two pairs of rollers 10, 11 roll on the upper side of the guide rails S along the longitudinal edges thereof. Mounted on the rollers 10, 11 are two oppositely disposed side plates 12, 13 that surround the guide rail 8 on both sides. Between their lower ends, these side plates 12, 13 hold a vertical support 14 on the underside of which is pivotably supported an arm member 15, on the free end of which is pivotably disposed a further arm member 16. The two arm members 15, 16 are tightly hinged to one another and are pivotable relative to one another in horizontal planes. The free end of the arm 16 is provided with a recess 17 for receiving the cone 18 of a tool WZ.

Figure 1:
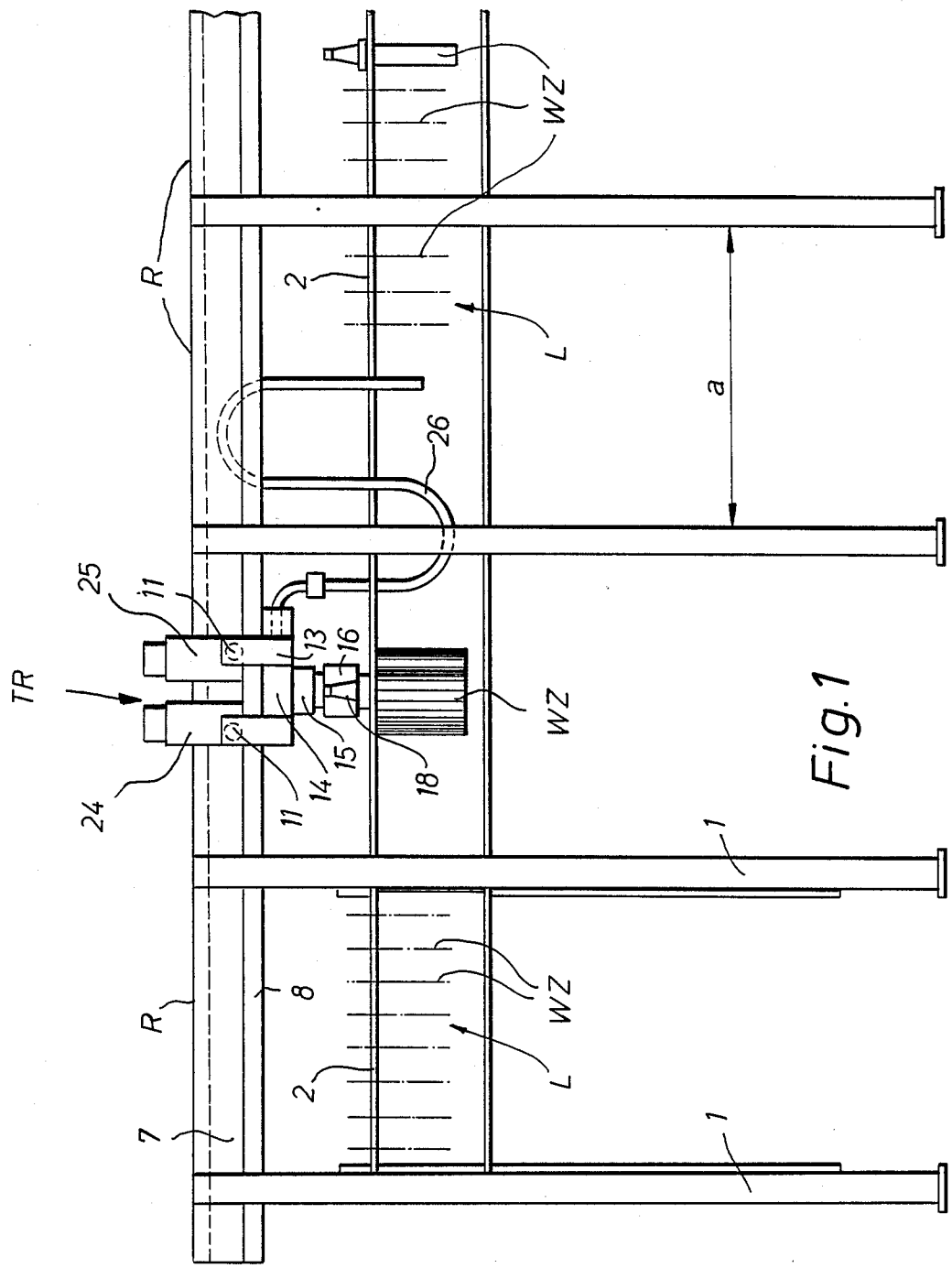
FIG. 1 is a side view of one exemplary embodiment of the inventive storage and transporting arrangement of the present invention.
Figure 2:
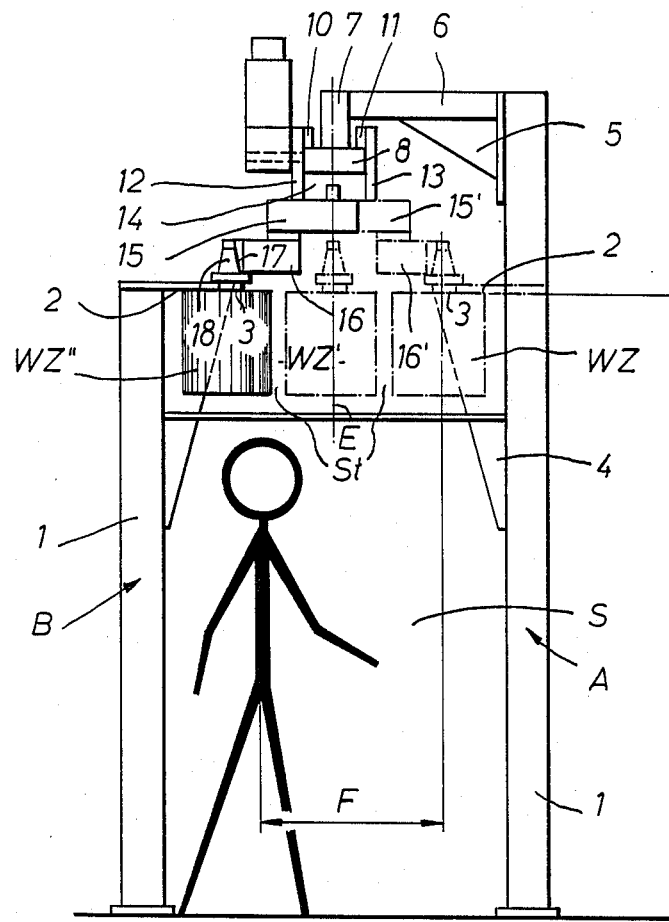
FIG. 2 is a vertical cross-sectional view through the holding unit of the arrangement, with a view toward the transporting unit thereof.

As shown in FIG. 2, the two arms 15, 16 can be pivoted into a position 15', 16', so that a tool WZ in one bottom 2 of the shelf row A can be transferred into the position WZ' and vice versa, and a tool can also be transferred out of a position WZ", in a shelf bottom 2 of the shelf row B (this position is shown in FIG. 3, is opposite the shelf bottom of the row A, and will be described in greater detail below), into the position WZ' and vice versa.

Figures 4, 5, 6:
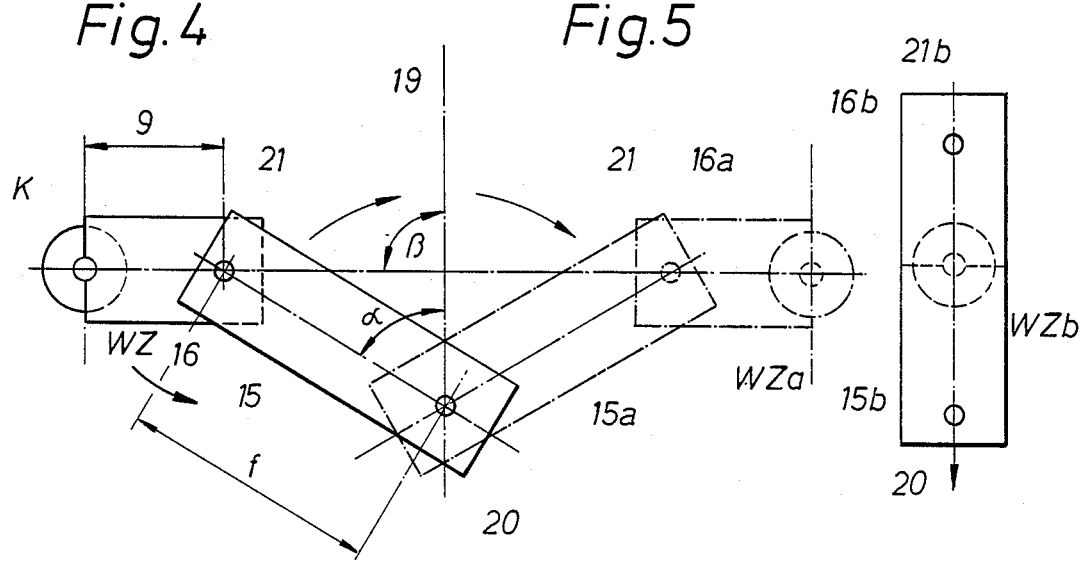
FIGS. 4-6 are views that illustrate the movement of a two-part pivot arm and the path of the tool from a shelf in the transport path along a shelf, or into the street between two oppositely disposed shelves.

FIG. 4 shows the starting position of the arms 15, 16, with the central longitudinal axis of the arm 15 forming an angle of, for example, 60° with the line 19, which represents the linear path of movement of the tool WZ along the shelf bottoms 2. The angle $\beta$ between the line 19 and the central longitudinal axis of the arm 16 forms an angle of 90°, with the distance "f" between the two pivot axes 20, 21 of the arm 15 over the distance "g" between the common pivot axis 21 and the vertical central axis K of the tool WZ forming a ratio of, for example, 2:1. The parts 15, 16 and WZ assume the illustrated positions 15-15b, 16-16b, and WZ-WZb in FIGS. 4-6, with FIG. 4 representing the first pivot position, FIG. 5 the second pivot position, and FIG. 6 the transport position of the parts between the shelves R of he rows A and B. If only a single shelf is provided, the position of the arms 15, 16 and the path of the tool WZ is correspondingly altered.

The tools WZ are moved on a short lever arm over a short path, so that the placement of the tools WZ in the transporting plane E saves time and can be effected without difficulty. The critical thing in this connection is the linear path of the tools out of the positions WZ and WZ" into the position WZ' (FIG. 2), which among other things also simplifies and benefits the shape of the recesses 3. Despite pivoting of the arms 15, 16, movement of the tools is effected along coordinates that are disposed at essentially right angles to one another. The transfer of a tool WZ from a shelf into a transfer position, for example in a further tool receiving member, is effected at a transfer position ü where the second row of shelves B is interrupted (FIG. 3).

The openings of the recesses 3 of the shelf bottoms 2 of the rows A and B face one another. The spaced-apart shelf rows A, B form between them a street G. in the central longitudinal plane of which is disposed the guide rail 8, which is also the transporting plane E of the pivot axis 20 of the arm 15.

The transporting unit can selectively transport tools either only out of the left shelves of the row B or only out of the right shelves of the row A or out of both shelf rows A, B, and transport them in the transporting plane E, depending upon which of the preferably coded tools WZ are needed.

Disposed either directly or via the side plates 12 on the vertical support 14 are two motors 24, 25 that receive power via a flexible line 26. The motor 24 effects movement of the transporting unit along the guide rail 8, while the motor 25 takes care of the pivoting movement of the arms 15 and 16. The line 26 also supplies control devices for grasping the tool cones 18 or for releasing the tools from the ends of the arm 16.

The bottoms 2 of the shelves R are disposed at a height H that permits a person to walk in the space S below the tools WZ on the shelves and below the transport path in the plane E (see FIG. 2).

As also shown in FIG. 2, the distance F between the recesses 3 of two oppositely disposed shelves of the rows A, B, at the same level, is such that the rest position of a tool WZ on the shelf and on the transport path in the plane E is only a slight distance St apart. The distance F of the recesses 3 preferably corresponds to twice the diameter of the tools with the largest circumference, plus the small distance St.

From the foregoing it can be seen that the holding and transporting arrangement of the present invention requires only two movements of the tool WZ, namely movement along the line 19, (FIGS. 4–6) into a position in the transporting plane E, and the transporting movement in this plane itself. The same is true for the reverse process of arranging a tool supplied from the transfer position ü into one of the shelves.

The tool-changing devices VW, which are illustrated in greater detail in FIGS. 7-19, serve to transfer the tools WZ that are supported on the arm 15 in the transfer stations ü into the machine magazine MG, and hence into a horizontal position, whereupon the tools, as known to an expert, are selectively supplied from this magazine to, for example, the arbor of the tool machine WM, or this described procedure is reversed for a used tool. The illustrated embodiments of the tool-changing device allow it to simultaneously remove a respective tool from the arm 15 and the magazine MG, or vice versa, and, after an appropriate rotation of the device by 90° into a new position, to transfer the tools to the arm 15 and the magazine MG.

In the embodiment illustrated in FIG. 7, the changing device VW has a changing arm with two arm parts 40, 41, those ends of which face one another are rigidly held in a small block 42. The arm parts 40, 41 have the same length, and their free ends are each provided with a gripper opening 43. The important thing with this embodiment is that the axes 43a, 43b of the openings 43 are disposed in two different planes that define a certain angle relative to one another, with this angle, when the changing arm is rotated by 180° and the shaft 44, as will be subsequently explained, has an angle of 45° relative to the vertical or horizontal, being a right angle. The shaft 44, upon which the small block 42 along with the arm parts 40, 41 are fixedly disposed, can be rotated about the axis 45 by 180°, whereby the arm parts 40, 41 themselves carry out a rotation of 90° about their own longitudinal axes, so that two tools can be grasped simultaneously and can be transferred into the desired positions. As indicated, the inclination of the axis 45 of the shaft 44 is 45° relative to the vertical or horizontal, with the vertical central plane through the longitudinal axis of the small block 42 forming the same angle of 45° with the axis 45. The modification illustrated in FIG. 8 shows that one or both arm ends could also be provided with laterally open gripper openings 46.

Figure 9:
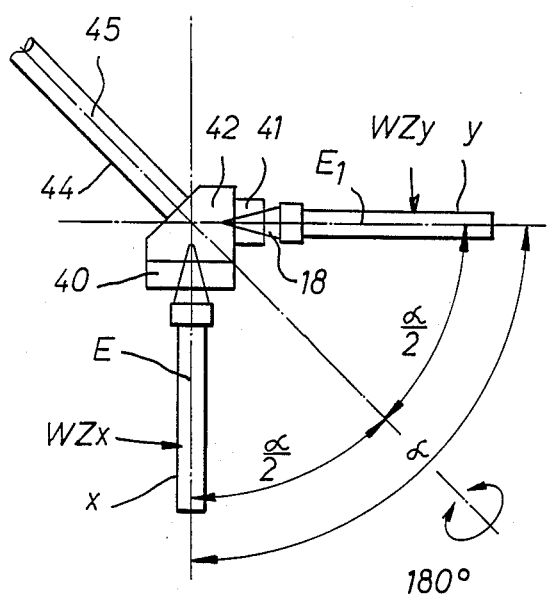
FIGS. 9-12 are further views and modifications of this first changing device.
Figure 10:
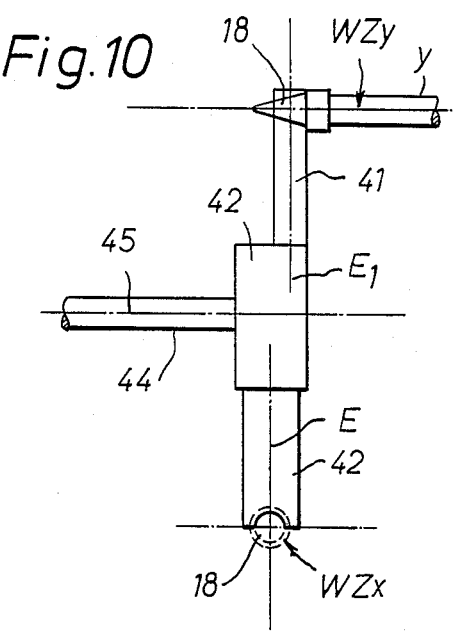

As can be seen in FIGS. 9–12, the pivot axis 45 of the shaft 44 is inclined in relation to the arm parts 40, 41 that are twisted relative to one another, with this pivot axis 45 also being disposed upon the angle bisector, or actually upon the projection of the angle bisector, between the positions X and Y of the tools WZx and WZy. This positioning allows the arms to grasp the tools and to be changed into positions that are in planes that are 90° to one another. FIGS. 9 and 10 show a 90° position of the starting positions X, Y of the tools WZx and WZy. The pivot axis 45 is disposed upon the projection of the bisector of the angle $\alpha$ between the two end positions of the two tools WZx and WZy with their cones 18, and is inclined relative to the central longitudinal planes E, $E_1$ of the two arms 40, 41 (see FIG. 9) by half of the angle $\alpha$.

Figure 11:
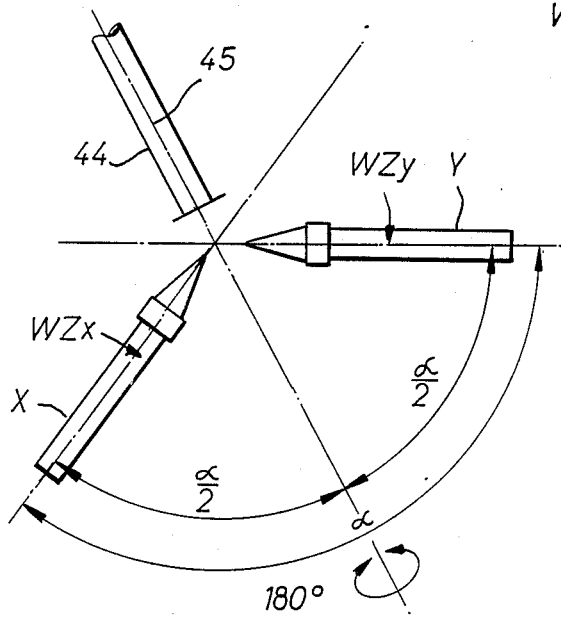
Figure 12:
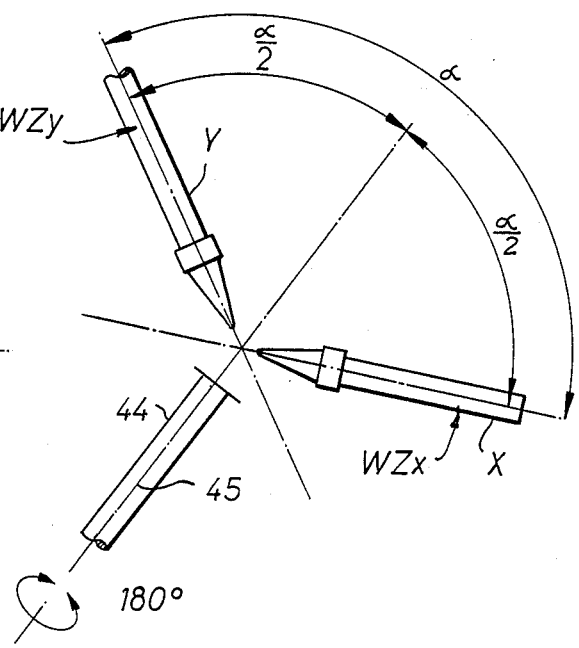

As shown in FIGS. 11 and 12, the angle $\alpha$ between the starting positions X, Y of the tools WZx and WZb can be any desired angle, with the angle illustrated being 127°. Again, the axis 45 is disposed upon the angle bisector, and the shaft 44 is inclined relative to the plane of rotation of the tools. Comparison between FIGS. 11 and 12 illustrates that the pivot shaft 44 can assume any desired position.

With the embodiment of the tool-changing device VW shown in FIGS. 13–19, which embodiment is intended for use when the space at the transfer station is limited, a small block 52 having a triangular cross-sectional shape is provided on a base part 51. The one surface 53 of the small block 52 is inclined at an angle $\alpha$ of 45° relative to the horizontal. Fixed to this side of the small block 52 is an arm 54, the longitudinal axis K of which is inclined at an angle $\alpha$, similarly of 45°, relative to the horizontal. The upper end of the arm 54 is provided with a pivot pin 59, the longitudinal axis of which forms the pivot axis $\sigma$ of a pivot arm 55, with the end 55a thereof being connected to the pin 59 in such a way that it can rotate by 180°. The pivot arm 55, which have any cross-sectional shape, but for stability reasons is preferably round, square, or rectangular, extends, as shown in FIGS. 13–19, to the side and at right angles to the axis of rotation or pivot axis $\sigma$. In its two end positions, the arm 55 is disposed parallel to the horizontal, as can be seen by a comparison of FIGS. 13–16 on the one hand, and 17 to 19 on the other hand. The end 55b of the arm 55 supports a changing arm 56 with which it is rigidly connected. The longitudinal axis N of the changing arm 56 is pivotable relative to the axis of rotation $\sigma$ of the arm 55, which coincides with the axis K, about an angle $\alpha''$ which is again 45° (FIG. 15).

Thus, in its end positions, the changing arm 56 is disposed in either a vertical or horizontal plane (vertical in FIGS. 13–16 and horizontal in FIGS. 17–19).

The changing arm 56 is provided with tool-receiving means 57a, 58a in which are disposed the cones 18 of the tools WZx, WZy, which are held at right angles to the longitudinal axis of the arm 56 and against the latter.

As will be described subsequently, after the pivot arm 55 is pivoted about the axis $\sigma$ by 180° out of the positions of FIGS. 17–19 into a horizontal position as shown in FIGS. 13–16, and vice versa, the tools are moved out of their suspended position in the arm 56. The horizontal position is that position in which the horizontal spindle 60 of a headstock SP, which can move up and down, grasps the new tool and transfers the used tool to the appropriate receiving means of the changing arm 56. The headstock with the spindle 60 is shifted so that the latter can give up the old tool and can grasp the new tool.

One possible method of operating with the second embodiment of the changing device and the arm 55 and changing arm 56 will now be described in conjunction with FIG. 19. The arm 55 and the changing arm 56 are disposed in the position indicated by solid lines. With a corresponding receiving of a tool, the changing arm 56 takes up a used tool, for example the tool WZx, from the spindle 60, which in this connection has carried out a movement in the direction of the arrow T. To place a new tool WZy in the spindle, the arms 55 and 56 remain in their positions, with the arm 56 being disposed vertically. Along with the spindle 60, the headstock SP carries out a vertical movement until the spindle 60 is aligned with the axis of the new tool WZy, whereupon the spindle takes over this tool from the arm 56. The changing arm 56 is now rotated about the pin 59 by 180°, so that the arms 55 and 56 assume the positions 55', 56', and the tools assume the positions WZx' and WZy', with these tools now hanging downwardly and vertically on the arm 56 (see FIGS. 14–17).

In this position of the arms 55 and 56, the used tool WZx can be placed in a movable magazine MG, preferably a chain magazine having horizontal tool storage. At the same time, a new tool WZy is removed from the magazine MG, since the provision of the tool storage in the magazine corresponds to the provision of the tool reception by the arm 56.

The pivoting movement of the tools, i.e. of the new and the used tool, is completed in a space saving manner along a circular arc about the axis K, which is disposed in a plane that is inclined at 45° to a horizontal plane. The arms 55 and 56 offer the possibility of grasping and positioning a used as well as a new tool with a single pivoting movement.

As is customary, the cones of the tools WZx and WZy project beyond the arm 56. However, for the sake of illustration, the cones are shown in the arm. The grasping mechanisms of the spindle 60, the arm 56, and the tool storage in the tool magazine MG are of a known type.

Figure 20:
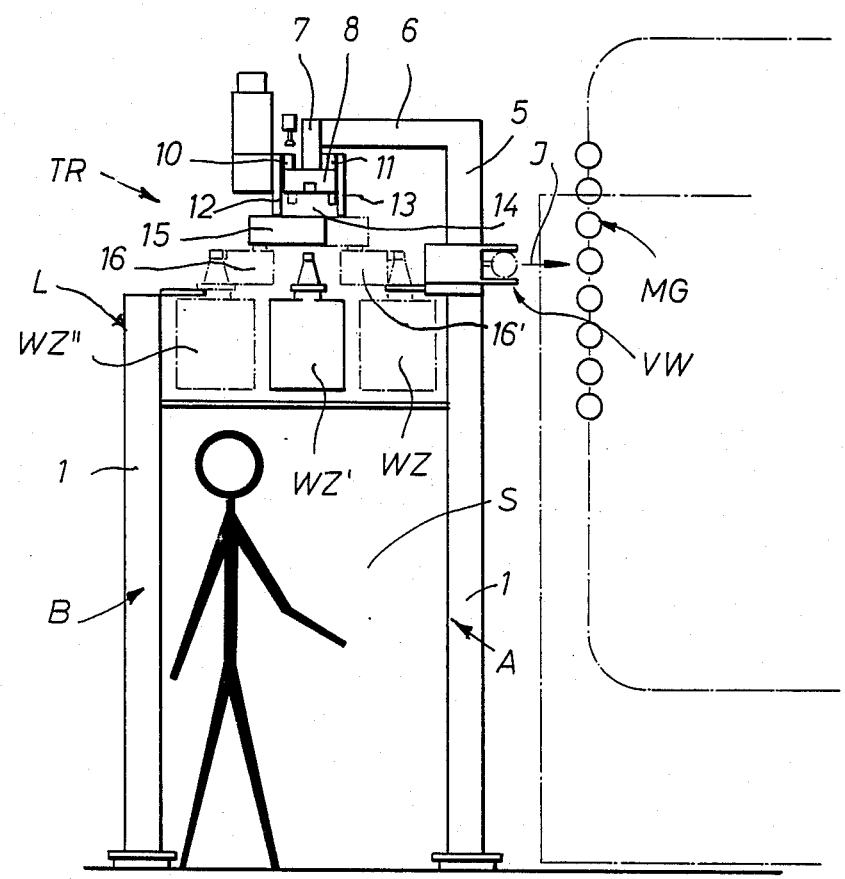
FIG. 20 is a view of the inventive transporting unit and changing device at the transfer position.

FIG. 20 shows the path of a tool in the position WZ in the row of shelves A, or a tool in the position WZ", into the transport position W', as well as the position and function of the changing device VW. If necessary, the changing device VW can, as illustrated, also complete a horizontal movement (the arrow τ as shown in FIG. 20) when, as shown in FIG. 20, the machine magazine MG is not disposed directly in the pivot range of the changing device.

The shelves R are designed in such a way that the shelf bottoms 2 can, from the outer side that faces away from the street G, be brought into their position on the supports 1, and vice versa (see double arrow P in FIG. 3).

With the changing device of FIGS. 13–19, the removal and delivery of a used and a new tool are effected by the movement of the headstock with the spindle 60, or by the movement of the chain magazine MG when the changing arm is stationary. The transport unit TR brings used tools from the changing device to the shelves R, and takes along a new tool on its way back to the changing device.

With the embodiment of the device of FIGS. 13–19 described above, the pivot arm 55, on the end 55b of which the changing arm 46 is tightly mounted at an angle of 45°, pivots about the pin 59 that is disposed on the longitudinal axis K of the arm 54. Alternatively, the arm 55 could also be pivoted 180° about an axis G (see FIGS. 15 and 17) that is disposed at right angles to the longitudinal axis K. For this purpose, the upper end of the arm 54 would have a fixed bearing yoke 80 (FIGS. 15 and 17) in which are rotatably disposed the pivot pins 81 of a small block 82 that is fixedly connected to the end of the arm 55. With this embodiment, the arm 56 carries out a 180° pivotal movement (see arrow T in FIG. 19), thereby intersecting the longitudinal axis K of the arm 54.

The present invention is, of course, in no way restricted to the specific disclosure of the specification and drawings, but also encompasses any modifications within the scope of the appended claims.

What we claim is:

1. A flexible manufacturing system for machining workpieces, comprising:
   several tool machines disposed in a row;
   a storage unit that includes several tool shelves that are disposed along a guideway and have recesses for holding tools, with said guideway being disposed directly adjacent said row of tool machines, and with said shelves having horizontal bottoms for supporting said tools in a perpendicular manner;
   a transporting unit for transporting said tools from said storage unit to a transfer station, with said transporting unit having a horizontally disposed pivot arm assembly for transporting said tools in a perpendicular position; and
   a changing device for receiving said tools from, and placing said tools in, said transporting unit at said transfer station, with said changing device being adapted to grasp a new tool from said transporting unit and a used tool from a tool machine, and vice versa, in two planes that are perpendicular to one another, and to pivot these tools by 180° to bring them into planes that are perpendicular to the planes that said tools were in when they were grasped.

2. A flexible manufacturing system according to claim 1, in which said guideway of said storage unit includes guide rail means with said shelves being disposed in at least one row, parallel to said guide rail means, with said recesses of said shelves being open toward said guide rail means.

3. A flexible manufacturing system according to claim 2, which includes a plurality of shelves disposed in two parallel rows t hat are spaced apart to provide a street therebetween in which said pivot arm assembly of said transporting unit transports said tools in a suspended manner.

4. A flexible manufacturing system according to claim 3, in which each of said shelves is provided with supports that include bracket means for supporting said guide rail means of said guideway.

5. A flexible manufacturing system according to claim 3, in which said shelves of a given row of shelves have an outer side, remote from the shelves of the other row of shelves, that is freely accessible, so that said shelf bottoms can be individually placed in or removed from said shelves from said outer side thereof.

6. A flexible manufacturing system according to claim 3, in which said shelf bottoms are disposed at a height that leaves free, below the suspended tool, a space that is large enough for a man to walk.

7. A flexible manufacturing system according to claim 3, in which the space between two parallel shelves that are disposed at the same height corresponds to twice the diameter of the tools with the greatest circumferences, plus the slight distance between two tools of said two parallel shelves.

8. A flexible manufacturing system according to claim 1, in which pivot arm assembly of said transporting unit is embodied as a double arm having two arm members, each with two ends, with adjacent ends of said arm members being tightly yet rotatably connected to one another.

9. A flexible manufacturing system according to claim 8, in which said double rm of said transporting unit transports said tools at least nearly linearly out of said recesses of said shelves and into the path of movement of said tools in the longitudinal direction of said guideway, and vice versa.

10. A flexible manufacturing system according to claim 9, in which the ratio of the axes of rotation of one of said arm members to the axes of rotation of the other of said arm members is approximately 2:1.

11. A flexible manufacturing system according to claim 10, in which during longitudinal travel of said transporting unit, said two arm members cover one another, and in a grasping and depositing position form an obtuse angle relative to one another.

12. A flexible manufacturing system according to claim 1, in which tool magazines are associated with said tool machines, with said magazines receiving said tools in a horizontal position parallel to said guideway.

13. A flexible manufacturing system according to claim 1, in which said changing device has a centrally mounted double-armed pivot arm for simultaneously changing two tools in two end positions where the longitudinal axes of the tools are disposed at right angles to one another; said pivot arm has two arms, each with an opening, the axes of which are twisted by 90° relative to one another, with said pivot arm having a pivot axis that is inclined relative to a common plane of said two arms, and is disposed on the bisector of the angle formed between the vertical and horizontal end positions of said tools.

14. A flexible manufacturing system according to claim 13, in which said pivot arm operates in a vertical or horizontal plane, with said pivot axis thereof being inclined by 45° to said plane.

15. A flexible manufacturing system according to claim 1, in which said changing device has a stationary arm that is inclined at 45° to the horizontal and has a pivot pin for a pivot arm that supports a changing arm that has two tool-receiving means that are disposed parallel to one another.

16. A flexible manufacturing system according to claim 15, in which said changing device is adapted to move to a tool magazine of said tool machines.

17. A flexible manufacturing system according to claim 15, in which said pivot arm is pivotably mounted on an end of said stationary arm in such a way as to be pivotable about a longitudinal axis of said stationary arm.

18. A flexible manufacturing system according to claim 15, in which said pivot arm is pivotably mounted on an end of said stationary arm in such a way as to be pivotable 180° about an axis that is disposed at right angles to a longitudinal axis of said stationary arm.

* * * * *